United States Patent
Hussey et al.

(10) Patent No.: US 9,147,530 B2
(45) Date of Patent: Sep. 29, 2015

(54) HERMETICALLY SEALED POLYMER CAPACITORS WITH HIGH STABILITY AT ELEVATED TEMPERATURES

(71) Applicant: Kemet Electronics Corporation, Simpsonville, SC (US)

(72) Inventors: Steven C. Hussey, Simpsonville, SC (US); Yuri Freeman, Simpsonville, SC (US); Philip M. Lessner, Simpsonville, SC (US); Qingping Chen, Simpsonville, SC (US); Javaid Qazi, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 160 days.

(21) Appl. No.: 14/018,001

(22) Filed: Sep. 4, 2013

(65) Prior Publication Data

US 2014/0061284 A1 Mar. 6, 2014

Related U.S. Application Data

(60) Provisional application No. 61/697,171, filed on Sep. 5, 2012.

(51) Int. Cl.
| | |
|---|---|
| *H01G 9/00* | (2006.01) |
| *H01G 13/00* | (2013.01) |
| *H01G 9/012* | (2006.01) |
| *H01G 9/028* | (2006.01) |
| *H01G 9/042* | (2006.01) |
| *H01G 9/06* | (2006.01) |
| *H01G 9/08* | (2006.01) |
| *H01G 9/15* | (2006.01) |

(52) U.S. Cl.
CPC .............. *H01G 13/00* (2013.01); *H01G 9/012* (2013.01); *H01G 9/028* (2013.01); *H01G 9/0425* (2013.01); *H01G 9/06* (2013.01); *H01G 9/08* (2013.01); *B23K 2201/38* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 3,255,386 | A * | 6/1966 | Millard et al. | 361/523 |
| 3,466,508 | A * | 9/1969 | Booe | 361/536 |
| 3,491,269 | A * | 1/1970 | Booe | 361/539 |
| 3,538,395 | A * | 11/1970 | Riley | 361/523 |
| 4,059,887 | A * | 11/1977 | Galvagni | 29/25.03 |
| 4,166,286 | A * | 8/1979 | Boissonnault | 361/532 |

(Continued)

FOREIGN PATENT DOCUMENTS

| KR | 10-1999-0075156 | 10/1999 |
|---|---|---|

OTHER PUBLICATIONS

Reed, "Characterization of Tantalum Polymer Capacitors", NEPP Task Report, Jet Propulsion Lab, NASA, 2006, p. 1-26.*

(Continued)

*Primary Examiner* — Devang R Patel

(74) *Attorney, Agent, or Firm* — Joseph T. Guy; Perkins Law Firm, LLC

(57) ABSTRACT

A process for providing an improved hermetically sealed capacitor which includes the steps of applying a solder and a flux to an interior surface of a case; flowing the solder onto the interior surface; remove flux thereby forming a flux depleted solder; inserting the capacitive element into the casing; reflowing the flux depleted solder thereby forming a solder joint between the case and the solderable layer; and sealing the case.

19 Claims, 9 Drawing Sheets

(56) References Cited

U.S. PATENT DOCUMENTS

| | | | |
|---|---|---|---|
| 4,330,929 A * | 5/1982 | Cripe | 29/25.03 |
| 4,434,084 A * | 2/1984 | Hicks et al. | 252/512 |
| 5,938,856 A * | 8/1999 | Sachdev et al. | 134/1.3 |
| 6,409,070 B1 | 6/2002 | Master et al. | |
| 7,352,563 B2 * | 4/2008 | Pelcak et al. | 361/541 |
| 7,563,290 B2 * | 7/2009 | Qiu et al. | 29/25.03 |
| 2006/0223732 A1 * | 10/2006 | Hori et al. | 510/175 |
| 2006/0237032 A1 * | 10/2006 | Cheng | 134/2 |
| 2009/0103248 A1 | 4/2009 | Lin | |
| 2009/0316337 A1 | 12/2009 | Manago et al. | |

OTHER PUBLICATIONS

Korean Intellectual Property Office as ISA; The International Search Report and Written Opinion; PCT/US2012/058042; Kemet Electronics Corporation; mailed Nov. 27, 2013.

\* cited by examiner

HERMETICALLY SEALED POLYMER CAPACITORS WITH HIGH STABILITY AT ELEVATED TEMPERATURES

CROSS-REFERENCE TO RELATED APPLICATIONS

The present application claims priority to U.S. Provisional Patent Application No. 61/697,171 filed Sep. 5, 2012 which is incorporated herein by reference.

BACKGROUND

The present invention is related to an improved hermetically sealed polymer capacitor and method of making an improved hermetically sealed polymer capacitor.

Hermetically sealed capacitors comprising polymeric cathodes have been utilized in the art for some time. One systemic problem with hermetically sealed capacitors comprising polymeric cathodes is a gradual increase in equivalent series resistance (ESR) and direct current leakage (DCL) at elevated temperatures. These systemic problems have always been considered a function of cathode breakdown and have therefore been accepted as an inherent function of the capacitor type.

Through diligent research the present inventors have discovered a mechanism of degradation which was previously unrealized and not predicted. By eliminating the unexpected mechanism of degradation hermetically sealed capacitors comprising polymeric cathodes can be manufactured with significant improvement in ESR and DCL thereby providing capacitors with a thermal stability previously considered unavailable.

The present invention provides a method of manufacturing a hermetically sealed capacitor comprising a polymeric cathode wherein the capacitor has improved thermal stability as indicated by improved ESR and DCL after exposure to elevated temperatures.

SUMMARY

It is an object of the invention to provide an improved hermetically sealed capacitor and method of making the hermetically sealed capacitor.

A particular feature of the invention is a hermetically sealed capacitor, comprising a polymeric cathode, wherein the capacitor has improved ESR and DCL performance after exposure to elevated temperatures.

These and other advantages, as will be realized, are provided in a process for forming a capacitor. The process includes the steps of:
providing a case;
applying a solder and a flux to an interior surface of the case;
flowing the solder onto the interior surface;
washing to remove flux thereby forming a flux depleted solder;
providing a capacitive element comprising:
an anode of a valve metal; an anode lead in electrical contact with the anode; a dielectric on the anode; and a cathode layer on the dielectric wherein the cathode comprises a doped conductive polymeric cathode and a solderable layer; inserting the capacitive element into the casing; reflowing the flux depleted solder thereby forming a solder joint between the case and the solderable layer; and sealing the case.

DESCRIPTION

The present invention is directed to an improved hermetically sealed polymeric cathode capacitor and a method for making same.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Figure 1:
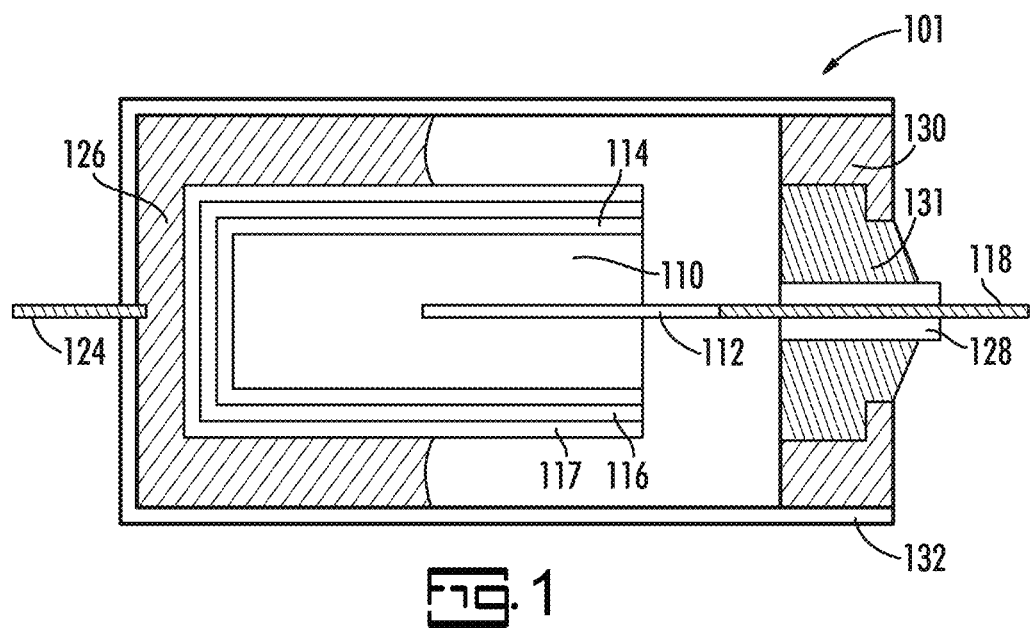
FIG. 1 is a cross-sectional schematic view of an embodiment of the invention.

An embodiment of a hermetically sealed solid electrolytic capacitor of the present invention will be described with reference to FIG. 1. In FIG. 1, a hermetically sealed capacitor is represented in schematic cross-sectional view at 101. The capacitor, comprises an anode, 110, which may be a monolithic anode body or multiple anodes comprising a valve metal. An anode wire, 112, extends from the anode body and can be attached to the anode body for example by welding, or the anode wire can be embedded in the anode body by compression. A dielectric, 114, is on the surface of the anode body and preferably at least partially encases the anode body. A conductive layer, 116, which functions as the cathode, is on the surface of the dielectric of the anode body and preferably at least partially encases the dielectric layer. As would be realized, the anode and cathode separated by a dielectric form the capacitive element. Additional conductive layers, 117, are preferably employed to provide an adequate interface for subsequent connection to the casing and the optional cathode lead wire, 124. The casing itself can function as the cathodic termination to a circuit trace. The additional conductive layers preferably include layers comprising carbon, silver, copper, nickel or other conductive materials, either in a binder or as a layer of deposited metal, and may include multiple layers. The deposited metal layers can be provided by vapor deposition, electroplating or electroless plating.

The capacitive element is hermetically sealed in a casing, 132, which in a preferred embodiment is a conductive casing. Flux depleted solder, 126, connects the conductive layers, 117, to the casing, 132, or to the cathode lead wire, 124. The optional cathode lead wire, 124, is attached to the casing or it may extend into the flux depleted solder, 126. An external anode lead, 118, is connected, preferably by welding, to the anode wire, 112. The external anode lead extends out of the casing. A positive seal, 128, contains at least a portion of the external anode lead and/or the anode wire. An edge seal, 131, hermetically seals the casing with the cap material, 130. While not limited thereto, the external anode lead and cathode lead are preferably nickel. Although many metallic and glass to metal seal materials can be used to provide hermetic sealing of the casing, the positive seal material and the edge sealing material are preferably solder.

The method of manufacturing the hermetically sealed solid electrolytic capacitor will be described with reference to FIG. 2.

Figure 2:
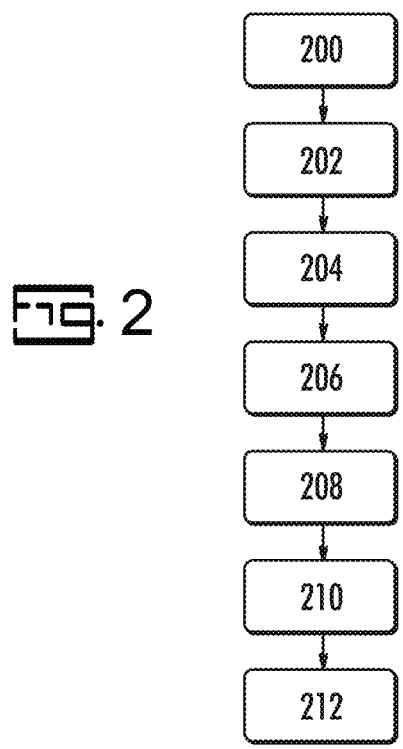
FIG. 2 is a flow chart representation of an embodiment of the invention.
Figure 3:
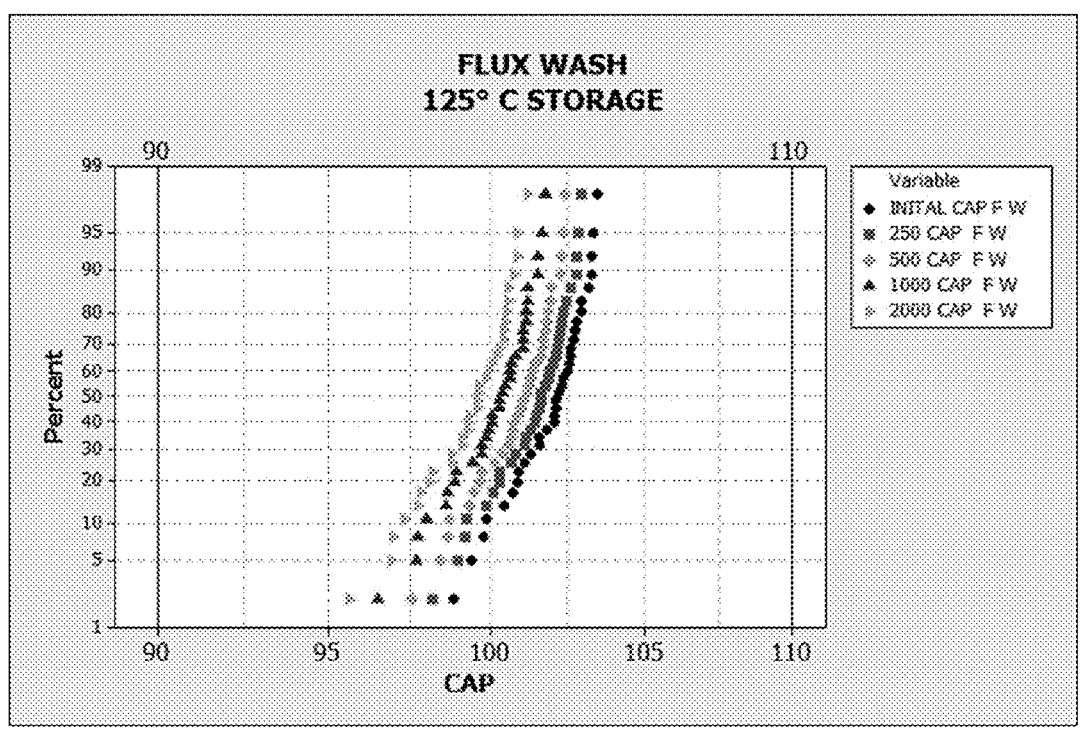
FIG. 3 is a graphical representation of the CAP of an inventive example.
Figure 4:
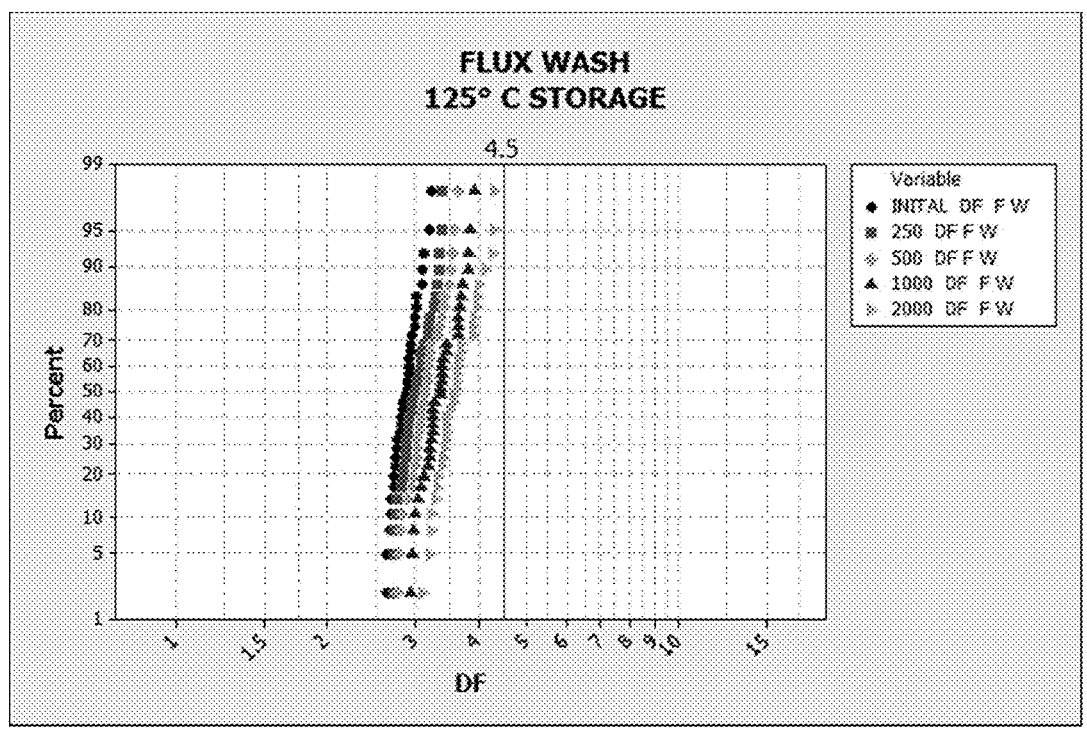
FIG. 4 is a graphical representation of the DF of an inventive example.
Figure 5:
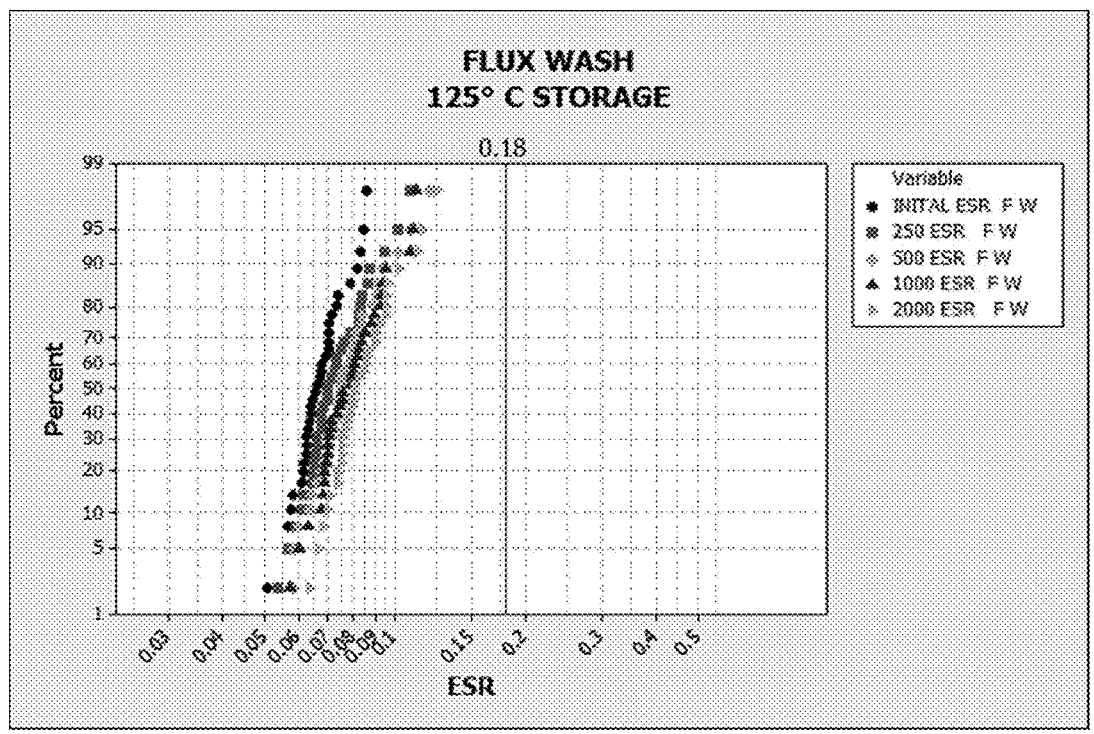
FIG. 5 is a graphical representation of the ESR of an inventive example.
Figure 6:
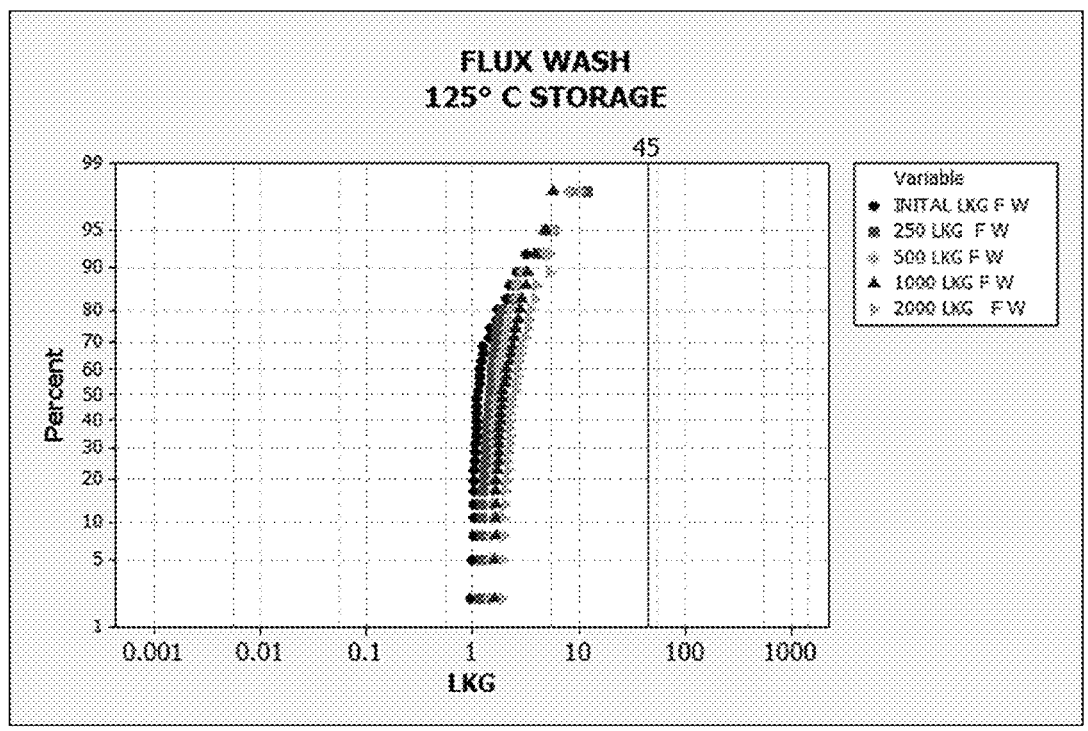
FIG. 6 is a graphical representation of the LKG of an inventive example.
Figure 7:
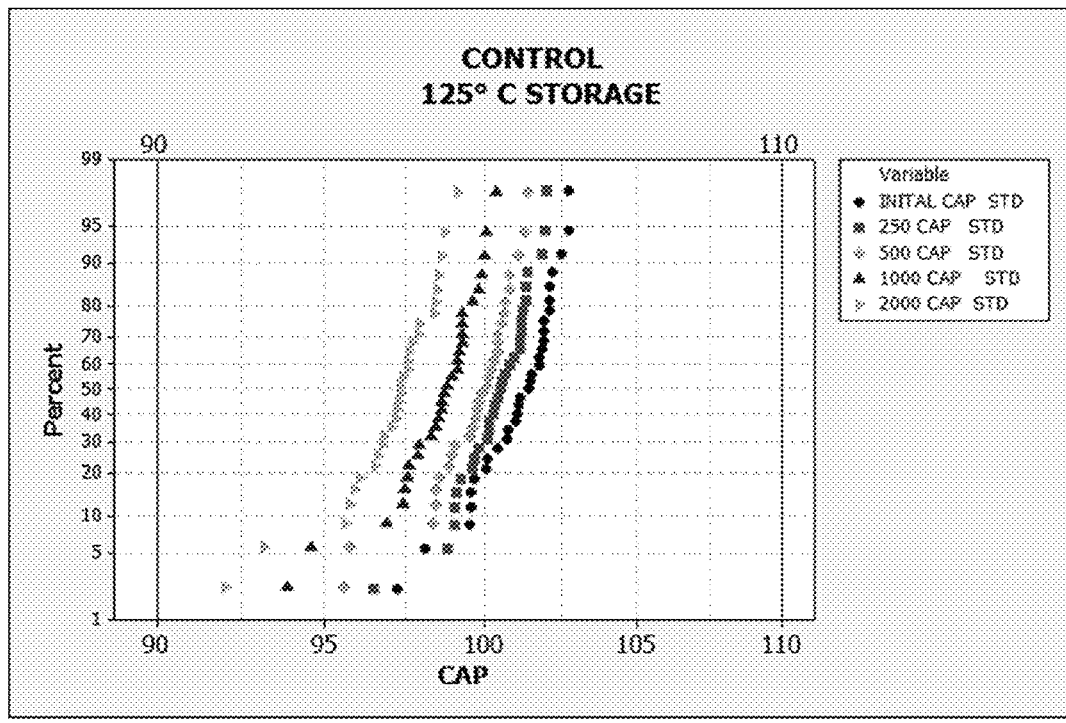
FIG. 7 is a graphical representation of the CAP of a comparative example.
Figure 8:
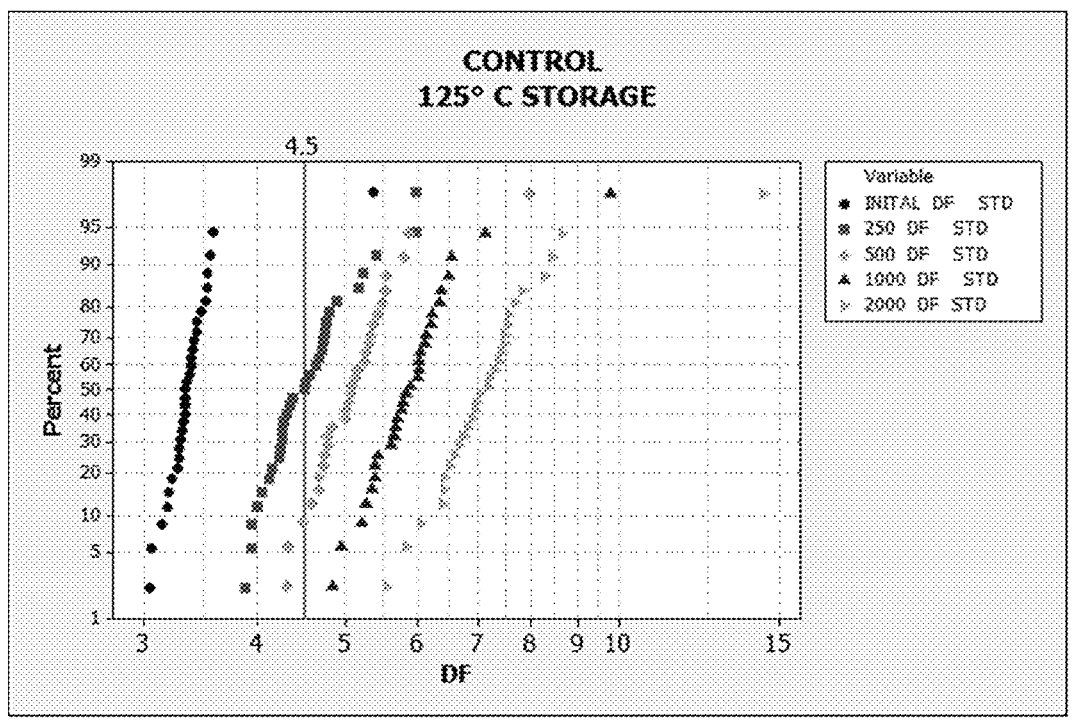
FIG. 8 is a graphical representation of the DF of a comparative example.
Figure 9:
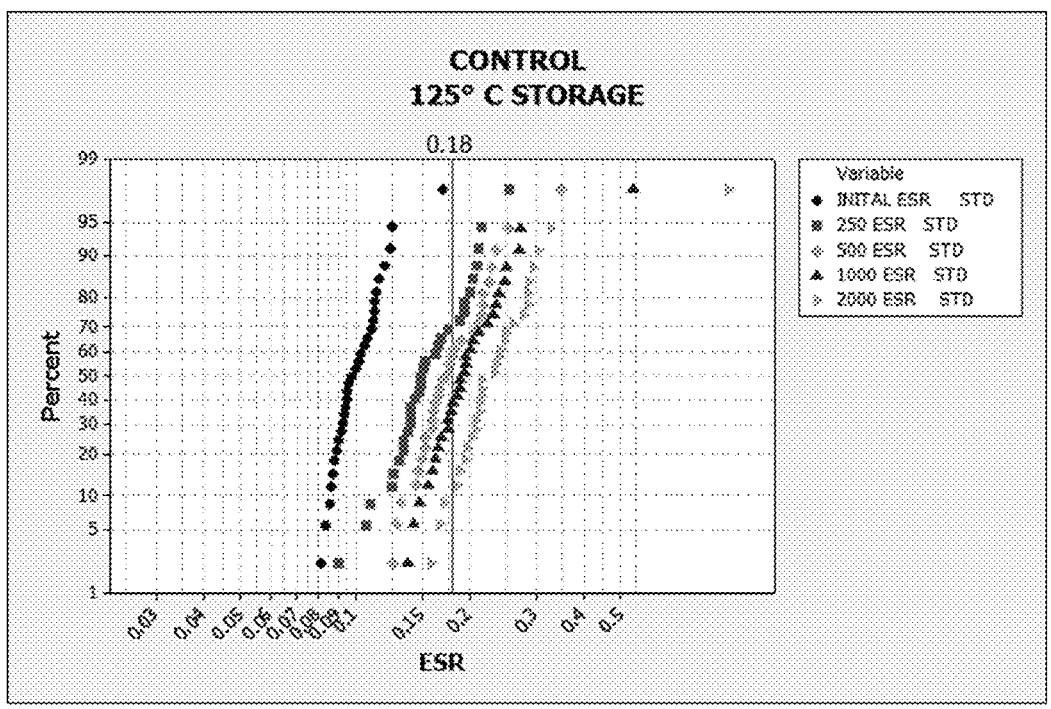
FIG. 9 is a graphical representation of the ESR of a comparative example.
Figure 10:
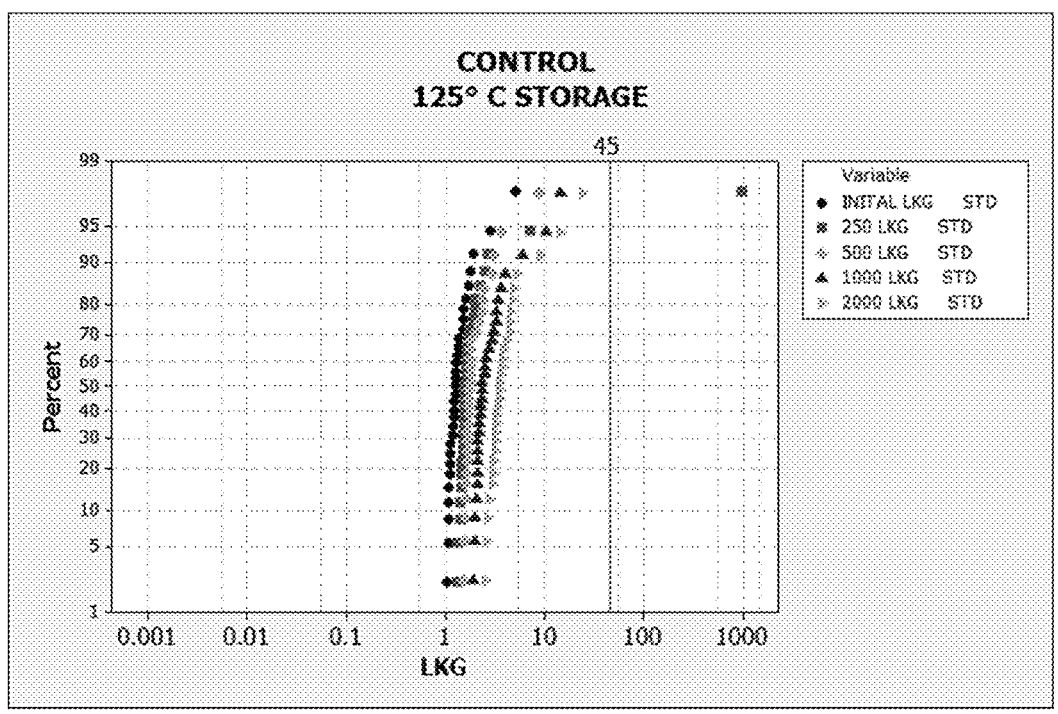
FIG. 10 is a graphical representation of the LKG of a comparative example.

In FIG. 2, an anode is formed at 200. In a preferred embodiment the anode is formed from a powder which is compressed and sintered to form a monolithic body. In another embodiment the anode is a foil which is optionally, and preferably, etched to increase surface area. The shape and dimension of the anode is not particularly limited herein. In the case of a compressed powder anode an anode wire can be attached to the anode after compression, such as by welding, or the anode wire can be inserted into the powder and the powder compressed around the anode wire thereby forming an anode with an anode wire embedded in the anode and extending therefrom.

A dielectric is formed on the anode at 202. While not limited thereto, a preferred dielectric is an oxide of the anode material. This is preferred primarily for manufacturing convenience. Preferably, the dielectric is an oxide of Al, W, Ta, Nb, Ti, Zr and Hf with $Al_2O_3$, $Ta_2O_5$ and $Nb_2O_5$ being most preferred. The method of forming the dielectric is not limited herein. Anodization of a valve metal to form a dielectric is well understood in the art and described in detail in U.S. Pat. Nos. 7,678,259; 7,248,462; 6,755,959; 6,652,729; 6,480,371; 6,436,268; 6,346,185; 6,267,861; 6,235,181; 5,716,511; 5,185,075 and 4,812,951. One method for anodization employs anodizing solutions having a water content below approximately 30% in combination with alkanol amine, phosphoric acid and an organic solvent. Monoethanol amine, diethanol amine, triethanol amine, ethyl diethanolamine, diethyl ethanolamine, dimethyl ethanolamine and dimethyl ethoxy ethanolamine (dimethyl amino ethoxy ethanol) are mentioned as alkanol amines. Ethylene glycol, diethylene glycol, polyethylene glycol 300 and tetraethylene glycol dimethyl ether, are mentioned as solvents. It is generally desirable to conduct the anodizing at temperatures below about 50° C., preferably within a pH range of 4-9 which can be adjusted with phosphoric acid if desired.

A cathode is formed on the dielectric at 204. The cathode is a conductor preferably comprising an intrinsically conductive polymeric material as known in the art. The cathode may include multiple layers wherein adhesion layers are employed to improve adhesion between the conductor and the termination. Particularly preferred adhesion layers include carbon, silver, copper, or another conductive material in a binder or a metalized layer such as nickel or silver. Conductive polymeric materials are employed as a cathode material. Particularly preferred intrinsically conductive polymers include polypyrrole, polyaniline, polythiophene and their derivatives. A particularly preferred conductive polymer is poly 3,4-ethylenedioxythiophene (PEDT). PEDT can be made by in situ polymerization of 3,4-ethylenedioxythiophene (EDT) monomer such as Clevius M V2, which is commercially available from Hereaus Clevious, with an oxidizer such as ferric tosylate solution available as Clevios®C from Hereaus Clevios. The application and polymerization of heterocyclic conductive polymers such as polypyrrole, polyaniline, polythiophene and their derivatives is widely described and well known to those of skill in the art. Additional conductive layers preferably include layers comprising carbon, silver, copper, nickel or other conductive materials, either in a binder or as a layer of deposited metal, and may include multiple layers which are preferably deposited on the polymeric cathode layer to improve subsequent adhesion. The conductive polymer typically includes at least one dopant which can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto. Polystyrene sulfonate is a particularly preferred dopant. Through diligent research it has now been realized that the degradation upon exposure to elevated temperature is due to the unexpected reaction of the flux, present in the solder, and the dopant, present in the conductive polymer. The flux was previously not considered as a culprit since the flux was previously considered to be active during reflow after which the flux was considered to be no more than an included inert impurity, as an oxide or slag, in the solder matrix. At elevated temperatures the flux, most likely as a vapor, has been determined to react with the conductive polymer cathode causing ESR and DCL increases.

Solder is applied to the inside of the can and the can is washed at 206. The solder includes a flux which leaches the native oxide from the surface of the interior of the can. The solder is converted to a flux depleted solder by washing with an organic solvent which removes most of the residual flux. The preferred organic solvents include alcohol, glycol, ketone, ether, ester, dimethyl-formamide (DMF), dimethyl sulfoxide (DMSO), methylene chloride, N-methyl-2-pyrrolidinone (NMP), with isopropyl alcohol and acetone being most preferred. In one embodiment the solvent is reclaimed and analyzed for impurities, such as by chromatography and particularly gas chromatography, for impurities consistent with the flux. A flux depleted solder is achieved when a lack of significant impurities is achieved. Preferably, the impurities in the solvent are at a level of less than 1 wt % and more preferably less than 0.1 wt %.

The capacitive element, which comprises an anode and cathode with a dielectric there between, is inserted into a casing at 208. The flux depleted solder is reflowed thereby forming a solder bond between the cathode of the capacitive element and the casing. The casing preferably has a cavity within which the capacitive element resides. The anode wire is electrically connected to an external anode connection and the cathode may be electrically connected to an external cathode connection.

The can is sealed at 210 either in ambient air, inert atmosphere, moist air or some combination thereof as exemplified in U.S. Pat. No. 8,379,311 which is incorporated herein by reference.

It is preferred that the capacitors be tested at 212. One preferred portion of the testing is a burn-in wherein the capacitor is subjected to 1.0 to 1.5 times of the rated voltage at a temperature of 50° C. to 150° C. More preferably, the capacitor is aged at 1.2 to 1.4 times of the rated voltage at a temperature of 75° C. to 125° C.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably, the anode comprises at least one material selected from the group consisting of Al, Ta, Nb and NbO with tantalum being most preferred.

The anode wire is most preferably constructed of the same material as the anode. The anode wire can be welded onto the anode surface under protective atmosphere or inserted into a powder prior to compression of the powder to form a porous anode body.

The dielectric is a non-conductive layer which is not particularly limited herein. The dielectric may be a metal oxide or a ceramic material. A particularly preferred dielectric is an oxide of an anode metal due to the simplicity of formation and ease of use.

The casing can be a metal or a ceramic. The casing may include a single layer or multiple layers with aluminum nitride, aluminum oxide, silicon oxide, magnesium oxide and calcium oxide being mentioned as exemplary materials. Conductive materials, such as a metal, are mentioned as exemplary for demonstration of the invention. The metal casing may include a surface coating on the interior and/or exterior thereof to increase conductivity or to improve solderability. A conductive casing may be constructed of brass with a solder coating, such as a Sn/Pb plating, on the inside and outside of the casing. The width, length and depth of the casing are selected for the application and are not otherwise limited herein. It would be readily apparent that a minimal size consistent with the application is preferred. In general, a length of 1 to about 25 millimeters with a width, or diameter in the case of a cylindrical case, of 0.5 to 10 millimeters is mentioned as being suitable for demonstration of the invention.

The internal conductive traces or conductive pads may be electrically connected to external conductive traces or pads thereby allowing the hermetically sealed capacitor to be mounted on a surface. The internal conductive traces or conductive pads and external conductive traces or conductive pads are electrically connected by any method known in the art. The conductive material may extend through the casing or may be in the form of pins, pads, sheets, etc. The external conductive traces or conductive pads are preferably as thin as possible to minimize total size of the hermetically sealed capacitor with the proviso that adequate conductivity is achieved. The solder is preferably a Pb/Sn based solder with 30-50 wt % Pb and the balance selected from Sn and other minor components such as silver. A solder with 30-50 wt % Pb, 45-69 wt % Sn and 1-5 wt % Ag is particularly preferred. A Pb/Sn/Ag solder with a 36/62/2 wt % ratio is particularly suitable.

The flux is preferably an organic acid capable of leaching the oxide from the surface of a material to be soldered. The flux increases the quality of the joint since oxides are detrimental to a solder joint. It was previously thought that the flux formed inert slag and any unreacted flux would either be an inert included impurity in the solder or minor portions would float to the surface of the solder. It was surprisingly found that a sufficient amount of flux remains on the surface of the solder as to be visible and the flux is detrimental to the capacitor performance especially under high temperature. Particularly preferred fluxes include organic acids selected from carboxylic acids. More preferred fluxes are based on natural or purified rosin such as those with RMA (Rosin Mildly Activated) in the MIL QQS Classification or L0 and L1 types in the ANSI classification. In a particularly preferred embodiment the flux is included with the solder in a core-shell arrangement wherein the solder has internal voids with flux contained therein. A particularly useful solder is referred to as a flux core solder wherein the solder is in the form of a hollow tube with flux contained therein. This is particularly advantageous since the flux/solder ratio is constant during the application of the solder. The flux depleted solder preferably has no visible flux residue on the surface of the solder. Without washing flux is visible. A cleanliness check can be performed by analyzing the solvent used to wash out the flux residuals, for example by using gas chromatography. A lack of significant impurities in the solvent from the last cycle of washing indicates an acceptable flux residual depletion. More preferably the solvent has less than 1 wt % impurities and even more preferably less than 0.1 wt % impurities.

A series of identical capacitive elements were prepared with a cylindrical tantalum anode with a diameter of 4.7 mm and a length of 10.2 mm comprising a tantalum wire lead. A tantalum pentaoxide dielectric was prepared as taught in accordance with U.S. Pat. No. 5,716,511. A cathode layer was formed using prepolymerized PEDT dispersion with polystyrene sulfonate dopant, Clevios K, available from Hereaus Clevios as taught in U.S. Pat. No. 7,563,290. Carbon containing and silver containing layers were coated on the PEDT layers. The samples were then separated into two groups for different treatments. For one set of samples (referred as control samples), each capacitive couple was placed in a solder coated brass casing with an outside diameter of 7.1 mm, a height of 16.5 mm and a wall thickness of 0.30 mm. Using a Sn/Pb/Ag/62/36/2 RMA flux core solder an electrically conductive bond was formed between the cathode and the casing. For the other set of samples (inventive samples) the same Sn/Pb/Ag/62/36/2 RMA flux core solder was placed inside the solder coated brass can and reflowed to obtain an electrically conductive bond between the solder and the can. The flux was then washed with acetone and isopropanol alcohol to obtain flux depleted solder. The capacitive element was then placed in the flux depleted soldered can. They were heated to melt the solder and an electrically conductive bond between the capacitive element and the casing was obtained. The entire population of sealed capacitors was heated to a temperature of 125° C. for up to 2000 hours. The capacitance in microfarads (CAP), dissipation factor in percent (DF), equivalent series resistance in ohms (ESR) and DC leakage current in microamperes (LKG) were measured and recorded. CAP and DF were measured with an AC signal at 120 Hz while ESR was measured at 100 KHz, as well known in the industry. The DC leakage was measured at rated voltage of 60V and a charging time of at least 90 seconds. FIGS. 3-6 illustrate the CAP, DF, ESR and LKG, respectively, of the inventive samples. FIGS. 7-10 illustrate the CAP, DF, ESR and LKG, respectively, of the control samples. As can be seen from the data the CAP and LKG are relatively unchanged whereas there is a marked improvement in the ESR and DF for the inventive samples relative to the controls.

One of skill in the art would realize additional embodiments and improvements which are not specifically enumerated but which are within the scope of the invention as specifically set forth in the claims appended hereto.

The invention claimed is:

1. A process for forming a capacitor comprising:
   providing a case;
   a solder including a flux to an interior surface of said case;
   reflowing said solder onto said interior surface to form an electrically conductive bond between said solder and said case;
   washing to remove said flux thereby forming a flux depleted solder;
   providing a capacitive element comprising:
   an anode of a valve metal;
   an anode lead in electrical contact with said anode;
   a dielectric on said anode; and a cathode layer on said dielectric wherein said cathode layer comprises a doped conductive polymeric cathode and a solderable layer;

inserting said capacitive element into said case;

reflowing said flux depleted solder thereby forming a solder joint between said case and said solderable layer; and sealing said case.

2. The process for forming a capacitor of claim 1 wherein said solder comprises lead and tin.

3. The process for forming a capacitor of claim 2 wherein said solder comprises 30-50 wt % lead, 45-69 wt % Sn and 1-5 wt % Ag.

4. The process for forming a capacitor of claim 1 wherein said solder comprises of Pb/Sn/Ag in 36/62/2 wt. % ratio.

5. The process for forming a capacitor of claim 1 wherein said solder and said flux are provided in a flux cored solder.

6. The process for forming a capacitor of claim 1 wherein said flux is an organic acid based flux.

7. The process for forming a capacitor of claim 6 wherein said flux is a rosin mildly activated (RMA) flux.

8. The process for forming a capacitor of claim 1 wherein said washing is with a solvent and further comprising reclaiming and analyzing said solvent after said washing.

9. The process for forming a capacitor of claim 8 wherein said analyzing is by chromatography.

10. The process for forming a capacitor of claim 8 comprising repeating said washing until said reclaimed solvent comprises less than 1 wt % flux.

11. The process for forming a capacitor of claim 10 comprising repeating said washing until said reclaimed solvent comprises less than 0.1 wt % flux.

12. The process for forming a capacitor of claim 1 wherein said doped conductive polymeric cathode comprises a conductive polymer selected from the group consisting of polypyrrole, polyaniline, polythiophene and their derivatives.

13. The process for forming a capacitor of claim 12 wherein said doped conductive polymeric cathode comprises polythiophene.

14. The process for forming a capacitor of claim 13 wherein said doped conductive polymeric cathode comprises poly 3,4-ethylenedioxypolythiophene.

15. The process for forming a capacitor of claim 1 wherein said doped conductive polymeric cathode comprises a dopant selected from the group consisting of polystyrene sulfonate.

16. The process for forming a capacitor of claim 1 further comprising attaching an external anode lead to said anode lead.

17. The process for forming a capacitor of claim 1 further comprising electrically attaching an external cathode lead to said cathode.

18. The process for forming a capacitor of claim 1 wherein said washing is with a solvent is selected from the group consisting of alcohol, glycol, ketone, ether, ester, dimethylformamide, dimethyl sulfoxide, methylene chloride and N-methyl-2-pyrrolidinone.

19. The process for forming a capacitor of claim 18 wherein said solvent is selected from the group consisting of isopropyl alcohol and acetone.

* * * * *